C. E. LUCKE.
MIXING AND PROPORTIONING VALVE.
APPLICATION FILED JAN. 8, 1913.
1,169,090.
Patented Jan. 18, 1916.
2 SHEETS—SHEET 1.
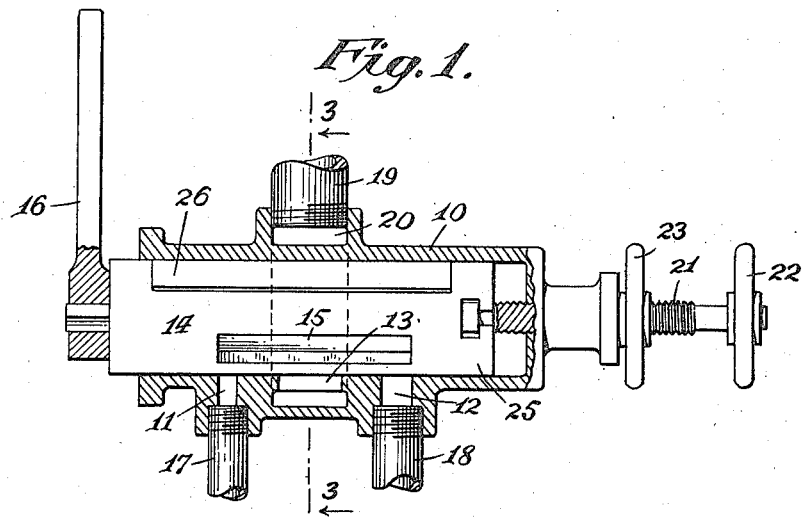
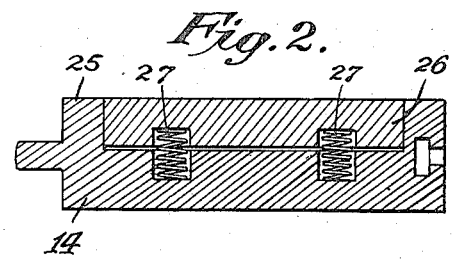
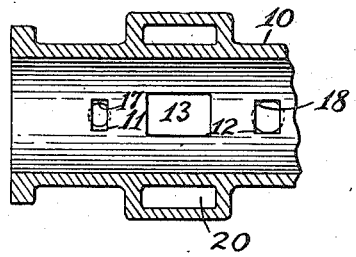
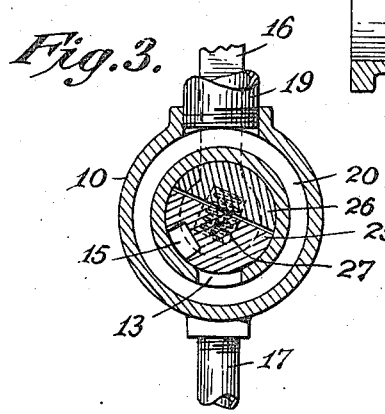
Attest:
L. R. Fox.
William S. Constant
Inventor:
by Charles E. Lucke
Arthur L. Kent, his Atty

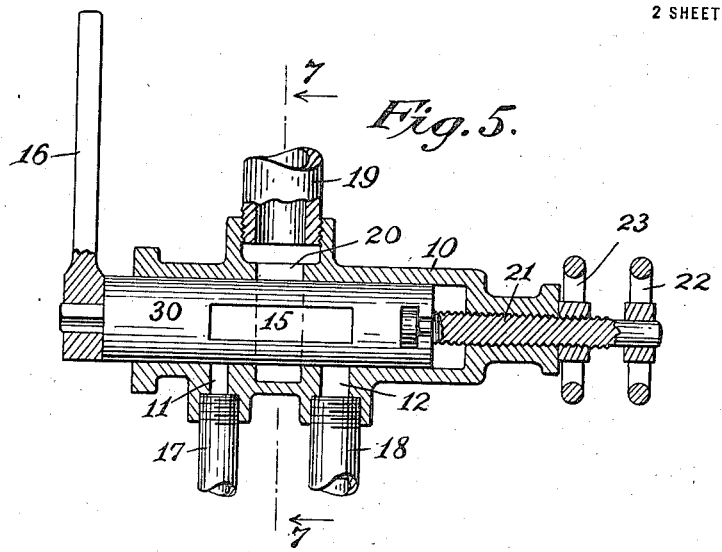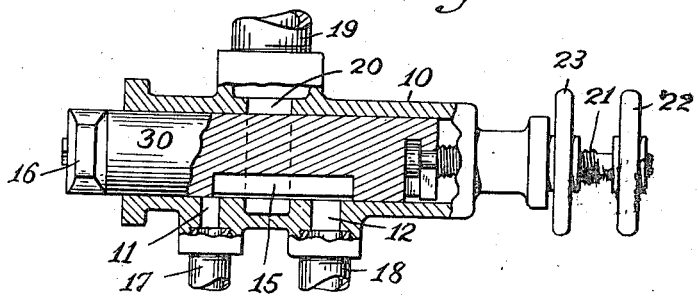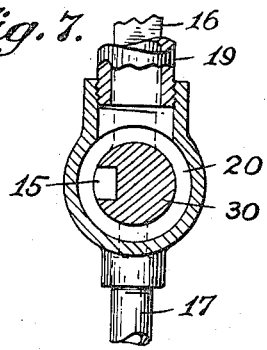

UNITED STATES PATENT OFFICE.

CHARLES E. LUCKE, OF NEW YORK, N. Y., ASSIGNOR TO GAS AND OIL COMBUSTION COMPANY, OF NEW YORK, N. Y., A CORPORATION OF DELAWARE.

MIXING AND PROPORTIONING VALVE.

1,169,090.  Specification of Letters Patent.  Patented Jan. 18, 1916.

Application filed January 8, 1913. Serial No. 740,884.

*To all whom it may concern:*

Be it known that I, CHARLES E. LUCKE, a citizen of the United States, residing at New York city, in the county of New York and State of New York, have invented certain new and useful Improvements in Mixing and Proportioning Valves, fully described and represented in the following specification and the accompanying drawings, forming a part of the same.

My invention relates to valves, and more particularly to a type of mixing valves.

The main object of the invention is to provide a valve whereby dissimilar fluids may be drawn and mixed in any desired volume up to the capacity of the valve, and whereby the proportion of one fluid entering into the mixture relative to that of the other may be controlled independently of the volume adjustment.

A further object is to provide a valve wherein the volume and proportionate quantity adjustments may both be secured by means of a single valve block or plug.

A still further object is to provide a valve which may be set to secure a desired mixture and may thereafter be operated to secure a varying volume of the mixture, without varying the proportions of the fluids entering thereinto.

A still further object is to provide a valve wherein the block or plug will automatically take up wear thereon so as to always find a perfect seat. And a still further object is to provide a valve which will be simple in design and may be readily and quickly adjusted to meet changing conditions of use.

The invention consists primarily in a valve embodying therein a valve seat forming means having a plurality of intake ports therein, a valve block seated against said seat, said valve block being ported to establish communication between said intake ports and an offtake, and independently operative means whereby said intake ports may be simultaneously and proportionately opened and said valve may be adjusted to vary the relative capacity of said intake ports; and in such other novel features of construction and combination of parts as are hereinafter set forth and described, and more particularly pointed out in the claims.

Referring to the drawings:—Figure 1 is a longitudinal section of a rotary valve embodying my invention, the valve block being shown in elevation; Fig. 2 is a sectional view of a self-seating valve block; Fig. 3 is a section on the line 3—3 of Fig. 1; Fig. 4 is a detail view of the interior of the casing, showing the arrangement of the ports therein; Fig. 5 is a view similar to Fig. 1, but of a modified form of valve, the valve being shown closed; Fig. 6 is a view similar to Fig. 5 showing the valve adjusted for different proportion, and fully open; and Fig. 7 is a section on the line 7—7 of Fig. 5.

In the forms of the invention shown, I employ a casing 10 having a cylindrical bore and providing the valve seat and having therein a plurality of intake ports 11 and 12 and an offtake port 13, preferably alined with and intermediate said intake ports. Seated in this casing is a valve block or plug 14 having a close working fit with the bore thereof, and provided with a port or channel as 15 adapted to simultaneously register, or communicate, with the intake ports 11 and 12 and the offtake port 13. The plug may be turned for opening and closing the valve by a handle 16 or other operating means. When a valve of this character is used for forming an explosive mixture of a fuel gas and air, the port 11 for gas will have less capacity than the port 12 for air. In order to have both ports open simultaneously and proportionately for all proportion adjustments, they are, in the form of valve shown, made rectangular, one dimension thereof, that in the direction of movement of the plug for opening and closing the ports, being the same, and the other dimension thereof, that axially of the casing 10, differing according to the desired maximum capacity of said ports. This construction permits the simultaneous opening of both valves and a gradual uniform proportionate increase in the capacity of the ports with continued movement of the valve block. By means of these ports and said valve block, the valve may be adjusted for volume only, to secure a desired quantity of the mixture, the proportions of the mixture not varying with the continued movement of the valve block.

Supply pipes 17 and 18 communicate with the intake ports 11 and 12 respectively, and communicating with the offtake port 13 is the offtake or delivery pipe 19 which for convenience is arranged upon the side of the casing 10 opposite to that from which the pipes 17 and 18 lead, the said offtake lead being in communication with the port 13 through a channel 20 formed in said casing and encircling the block or plug 14. By having this channel completely encircle the plug, the desired capacity may be secured with a smaller channel than would otherwise be required and a better commingling of the two gases prior to their discharge into the lead 19 is secured. This construction, however, is largely a matter of convenience, and the lead 19 may be connected with the offtake port in any desired manner.

To permit an adjustment of the valve in a manner to vary the proportions of the gas and air or other dissimilar fluids entering into the mixture, I provide means whereby the valve may be so adjusted as to vary the relative capacity of the intake ports. In order to secure such an adjustment without loss of the simultaneous opening and proportionate adjustment for volume with any desired adjustment for proportions, I provide means whereby the relative effective dimensions of the ports 11 and 12 axially of the casing 10 may be varied. Preferably I utilize the valve block or plug 14 for accomplishing this adjustment for proportions, providing means, as the screw 21 having an operating handle 22 and lock nut 23, for adjusting the position of the block endwise within the casing. This screw operates in screw threads carried in the head of the casing 10 and may be connected to the block or plug 14 by a suitable swivel connection as shown.

In the form of the invention shown in Figs. 1 to 4 of the drawings inclusive, I show a rotary block which is adapted to automatically adjust itself to compensate for wear and form a gas tight joint. In this construction, the block is made up of a main part 25 which is recessed or cut away on the side opposite the port 15, and a pressure piece or section 26 set in the recess of the main part 25 and pressed outwardly against the casing by springs 27 seated in recesses formed in the part 25. By this construction, the main part of the valve block which has the port 15 is kept pressed against the casing in gas tight contact therewith, and any wear is automatically taken up. The springs 27 should be of sufficient strength to resist the pressure exerted on the block at the intake ports.

In the modification shown in Figs. 5 to 7, inclusive, the construction is substantially the same as that shown in the preferred form, the principal difference being that a unitary rotary cylindrical block or plug 30 is used instead of the expanding block shown in Figs. 1 to 4. The operation of both forms so far as the adjustment for volume and the adjustment for proportions is concerned, is identical.

The operation of the herein described valve is substantially as follows:—When the valve is shut off, the intake ports 11 and 12 will be closed and no flow of fluid therethrough will occur. When it is desired to open the valve, the plug or block 14 is moved to simultaneously open both of the ports 11 and 12, a proportionate flow, determined by the capacities of these two ports, following. To increase the volume of the flow, a continued opening movement of the block or plug is all that is necessary, the result being merely an increase of volume, the proportions of the two fluids passing through the valve, and which are mixed within the valve in the constructions shown, remaining the same. If it be desired to change the proportions of the two fluids in the mixture, the lock nut 23 is released and the adjustment screw 21 or its equivalent is actuated, thus varying the relative capacity of the outlet ports 11 or 12 and increasing the proportion of either fluid in the mixture according to the direction of movement imparted to the plug through this screw. When the desired proportions in the mixture are secured, the proportion adjusting device is set in its adjusted position, thus insuring permanency in the proportions entering into the mixture, without, however, interfering with the adjustment for volume, such adjustment, that is, adjustment for volume, then resulting as before in an increase or decrease of the volume without varying the proportions of the fluids entering into the mixture. It will be observed that in the valves shown the rotative block has a rotary movement in adjusting for volume, and an axial movement in adjusting for proportions, and that these adjustments may be accomplished at the same time or at separate times, as desired. The feed screw provides a simple means for accomplishing the adjustment for proportions, by which exactness of adjustment is secured, and when the adjustment is once secured, the adjustment means may be locked in position so as to avoid any variance in the adjustment and consequent loss of proportions.

In the accompanying drawings I have shown a form of valve which I prefer for accomplishing this result, but it is not my intention to limit my invention to the precise details of construction shown in the drawings, as it is apparent that such may be varied without sacrificing important advantages secured in the form of the invention shown.

What is claimed is:

1. A valve embodying therein valve-seat-forming means having a plurality of intake ports therein for supplying different fluids, a valve block seated against said valve seat and ported to simultaneously establish communication between said intake ports and an offtake, adjusting means for adjusting the valve to vary the relative capacity of said intake ports, and means independent of said adjusting means whereby all of said intake ports may be simultaneously and proportionately opened without affecting the adjustment of the valve for the relative capacity of said ports.

2. A valve embodying therein valve-seat-forming means having a plurality of intake ports therein for supplying different fluids, a valve block seated against said valve seat and ported to establish communication between said intake ports and an offtake, the relative capacity and arrangement of said intake and valve block ports being such as to cause a simultaneous opening of all said intake ports and a proportionate variance in volume of flow with a continued movement of said valve block, adjusting means for adjusting said valve block to vary the relative capacity of said intake ports, and means independent of said adjusting means whereby said valve block may be moved to simultaneously and proportionately open all of said intake ports without affecting the adjustment of the valve block for relative capacity of the intake ports.

3. A valve embodying therein a casing having a cylindrical bore and two intake ports communicating therewith for supplying different fluids, a rotary plug mounted in said bore and ported to simultaneously establish communication between said intake ports and an offtake, adjusting means for adjusting said plug axially of said casing to vary the relative capacity of said intake ports and the relative proportions of the fluids passing therethrough and entering into the mixture when the valve is open, and means independent of said adjusting means whereby said plug may be rotated to vary the volume of flow through the valve without affecting the adjustment of the plug for relative capacity of the intake ports.

4. A valve embodying therein a casing having a cylindrical bore and two intake ports for supplying different fluids and an offtake port communicating therewith, a rotary plug mounted in said bore having therein a port adapted to simultaneously establish communication between both of said intake ports and said offtake port, adjusting means for adjusting said plug axially of said casing to vary the relative capacity of said intake ports and the relative proportions of the fluids passing therethrough and entering into the mixture when the valve is open, and means independent of said adjusting means whereby said plug may be rotated to vary the volume of flow through the valve without affecting the adjustment of the plug for relative capacity of the intake ports.

5. A valve embodying therein a casing having a cylindrical bore and two intake ports for supplying different fluids and an offtake port communicating therewith, a rotary plug mounted in said bore ported to simultaneously establish communication between both of said intake ports and said offtake port, an adjusting screw having a swivel connection with said plug whereby said plug may be adjusted axially of said casing to vary the relative capacity of said intake ports and the relative proportions of the fluids passing therethrough and into the mixture, and means independent of said adjusting screw whereby said plug may be rotated to vary the volume of flow through the valve without affecting the adjustment of the plug for relative capacity of the intake ports.

6. A valve embodying therein valve-seat-forming means having two intake ports and an offtake port therein, said ports being alined and said offtake port being intermediate said intake ports, a valve block seated against said valve seat and having a port or channel therein of a length to simultaneously communicate with all of said ports, adjusting means for adjusting said valve block along the line of said ports to vary the relative capacity of said intake ports, and means independent of said adjusting means whereby said intake ports may be simultaneously and proportionately opened without affecting said adjustment of the valve block.

7. A valve embodying therein valve-seat-forming means having a plurality of intake ports, each of said intake ports being rectangular and one of said ports being of shorter dimension than the other in the direction of adjustment for proportions, a valve block seated against said valve seat and having a port therein adapted to be placed in communication simultaneously with all of said intake ports, adjusting means for adjusting the valve block rectilinearly of said ports in the direction of the adjustment for proportions to vary the relative capacity of said ports, and means independent of said adjusting means whereby said valve block may be moved to simultaneously and proportionately open all of said intake ports without affecting the adjustment of the valve block for relative capacity of the intake ports.

In testimony whereof I have hereunto set my hand in the presence of two subscribing witnesses.

CHARLES E. LUCKE.

Witnesses:
W. S. CALDWELL,
A. L. KENT.